United States Patent [19]

Kuwahara et al.

[11] Patent Number: 4,833,624
[45] Date of Patent: May 23, 1989

[54] FUNCTIONING-DISTRIBUTED ROBOT CONTROL SYSTEM

[75] Inventors: Hajime Kuwahara; Takaharu Matsumoto; Yutaka Ono, all of Tokyo, Japan

[73] Assignee: Yokogawa Electric Corporation, Tokyo, Japan

[21] Appl. No.: 170,049

[22] Filed: Mar. 17, 1988

Related U.S. Application Data

[63] Continuation of Ser. No. 876,123, Jun. 19, 1986, abandoned.

[30] Foreign Application Priority Data

Apr. 2, 1986 [JP] Japan .................................. 61-75685

[51] Int. Cl.⁴ ................................................ G06F 9/00
[52] U.S. Cl. .................................... 364/513; 364/132; 318/568.2; 318/568.24; 901/9
[58] Field of Search ............... 364/513, 131, 132, 133, 364/135, 138, 139, 474, 478; 901/9, 10, 46, 47, 15; 318/568

[56] References Cited

U.S. PATENT DOCUMENTS

| | | | |
|---|---|---|---|
| 4,347,563 | 8/1982 | Paredes et al. ........................ | 364/133 |
| 4,380,696 | 4/1983 | Masaki .................................. | 364/513 |
| 4,467,436 | 8/1984 | Chance et al. ........................ | 364/513 |
| 4,478,629 | 10/1984 | Wood et al. .......................... | 364/138 |
| 4,484,293 | 11/1984 | Minucciani et al. ................. | 364/513 |
| 4,497,019 | 1/1985 | Waber .................................. | 364/133 |
| 4,547,858 | 10/1985 | Horak .................................. | 364/513 |
| 4,550,375 | 10/1985 | Sato et al. ............................ | 364/138 |
| 4,578,764 | 3/1986 | Hutchins et al. ..................... | 364/513 |
| 4,598,380 | 7/1986 | Holmes et al. ....................... | 364/513 |
| 4,613,269 | 9/1986 | Wilder et al. ........................ | 364/513 |
| 4,613,942 | 9/1986 | Chen .................................... | 364/513 |
| 4,616,326 | 10/1986 | Meier et al. .......................... | 364/513 |
| 4,633,414 | 12/1986 | Yabe et al. ........................... | 364/513 |
| 4,704,694 | 11/1987 | Czerniejewski ..................... | 364/513 |

Primary Examiner—Allen MacDonald
Attorney, Agent, or Firm—Moonray Kojima

[57] ABSTRACT

A robot system comprising a main computer having a robot language incorporated therein and having the functions of preparing, executing and storing programs and a plurality of slave computers connected via a high speed data bus to the main computer. Task programs are prepared by using the robot language and then executed on the main computer. The task programs inherent to the respective functions, such as trajectory control for the manipulator, vision control and feature extraction of objects are executed in each of the slave computers by commands issued from the main computer to the respective slave computers for each operational unit.

9 Claims, 12 Drawing Sheets

FUNCTIONING-DISTRIBUTED ROBOT CONTROL SYSTEM

This is a continuation of Ser. No. 876,123, filed June 19, 1986, now abandoned.

BACKGROUND OF THE INVENTION

1. Field of Invention

This invention relates to a robot system, and more particularly to such a system which can efficiently perform complex tasks, such as adjustment, testing and assembly of products, and which is capable of being expanded in number of functions, can perform concurrently a plurality of parallel operations and can effectively be controlled in real time all with efficiency and reliability.

2. Description of the Prior Art

Figure 1:
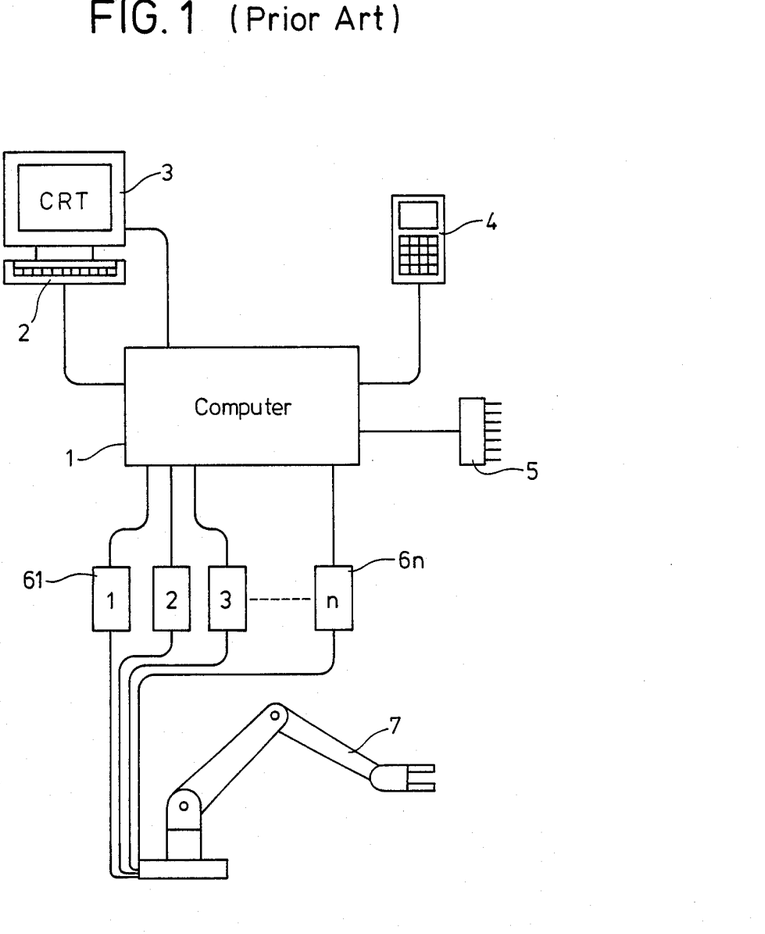
FIGS. 1,2,3 depict conventional robot systems.
Figure 2:
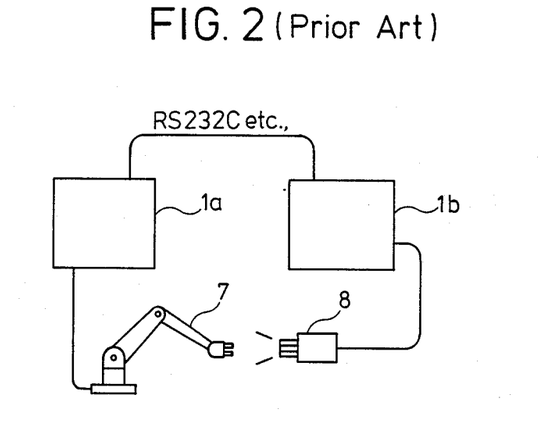
Figure 3:
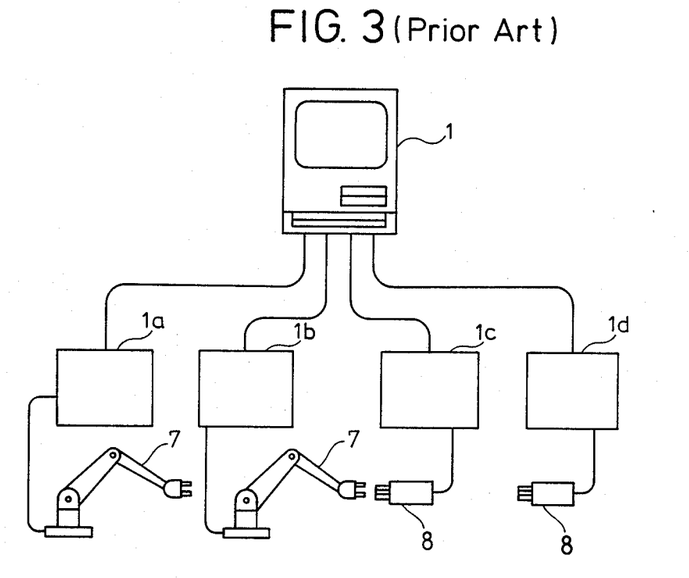

FIGS. 1,2,3 describe a conventional robot system and variations thereon, comprising a computer 1, a keyboard 2 for development of programs, input/output equipment 3, such as a CRT, a manual operation device 4, and input/output terminals 5 for connection with peripheral devices. The output from computer 1 is applied to servo-controllers $6_1$–$6_n$ (which are equal in number to the number of joints of the manipulator, for example) for control of a robot arm 7. For causing the robot to conduct highly skilled operations similar to movements of the human arm requires use of two robot arms, and directions for moving the arms in cooperation with or by processing signals from visual sensors such as TV cameras.

Since the system shown in FIG. 1 has computer 1 as a main part, computer 1 is responsible for undertaking such functions. However, to accurately move the robot arms requires mathematical operations which range in the area of about ten thousand times per second for the calculation of data conversion applied on a cartesian coordinate into angular data for movement of the joints. Thus, it is difficult to accurately move the two arms simultaneously or to perform image processing.

FIGS. 2 and 3 depict conventional system which attempt to improve the above discussed difficulty. The system shown in FIG. 2 comprises a computer 1a used exclusively for moving an arm 7 and an image processing system 1b for processing signals from a vision sensor 8. Computer 1a and image processing system 1b are connected via a general purpose communication line (RS 232 C, etc).

The system shown in FIG. 3 comprises main computer 1, robot processors 1a, 1b for moving arms 7 and image processors 1c, 1d for processing signals from visual sensors 8, all under control of main computer 1.

However, since these conventional robot systems have been developed on the basis of numerical control (NC) machine tools, it has been difficult to attain highly skilled cooperative functions. Also, it is difficult to adjust the systems for frequent changes of tasks and frequent changes of products being worked on.

SUMMARY OF THE INVENTION

Accordingly, an object of the invention is to overcome the aforementioned and other deficiencies and disadvantages of the prior art.

Another object is to provide a robot system having such properties as expandability, flexibility, and which can be readily adapted for frequent changes of tasks and products worked on, and which is capable of high efficiency, and reliability.

The foregoing and other objects are attained by the invention which encompasses a robot system comprising a main computer incorporating robot languages therein and having functions of preparing, executing and storing programs, and a plurality of slave computers connected via a high speed bus to the main computer, wherein the main computer executes task programs prepared by using the robot language and each of the slave computers executes the trajectory generation for the arms, conversion to angles of the joints, vision control and feature extraction, etc, respectively, in accordance with commands from the main computer for the respective operational units. The main computer performs centralized information control, while the slave computers execute their individual functions thereby increasing the flexibility of the system architecture and enabling parallel movement of the arms of the manipulators and vision, as well as efficiency of cooperative functioning of the arms. Furthermore, data access and communication between programs are accomplished at high speeds. The robot system can be readily adjusted to accommodate frequent changes of tasks and products being worked on by centralizing all of the programs and data in the main computer.

DETAILED DESCRIPTION OF PREFERRED EMBODIMENTS

Figure 4:
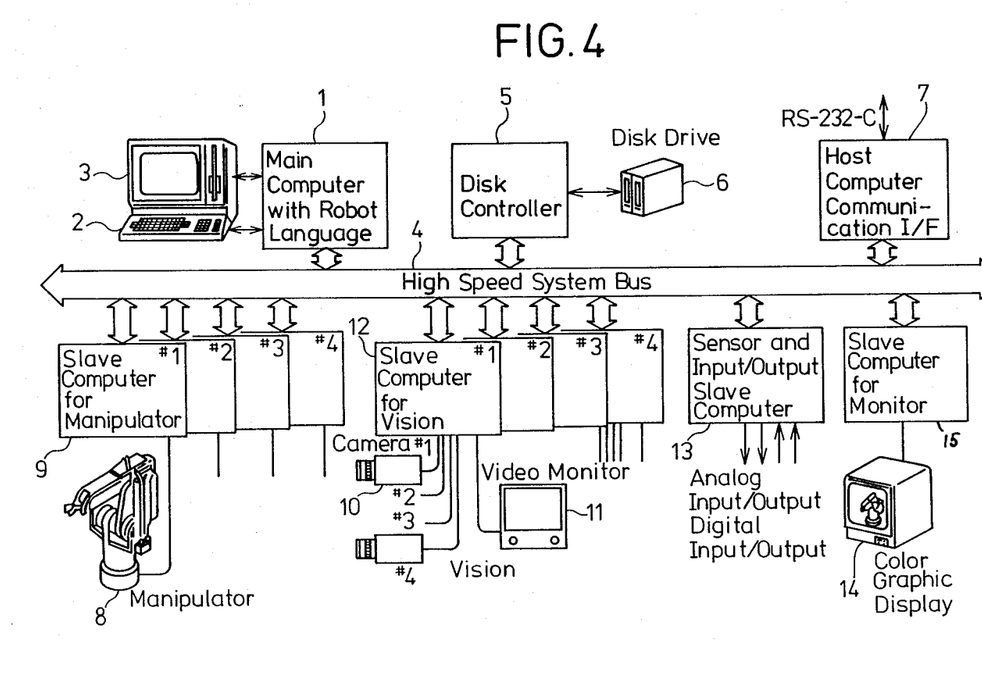
FIG. 4 is a block diagram depicting an illustrative embodiment of the invention.

FIG. 4 shows an illustrative embodiment wherein a main computer 1 has incorporated therein a robot language and has the functions of preparing, executing and storing programs, with a keyboard 2 for development of programs and a CRT 3 for displaying various information. The embodiment also comprises a high speed system bus 4, a disk controller 5 which is connected via bus 4 to main computer 1, a disk device 6 and a communication interface 7 for communicating with a supervisory computer (not shown).

The system further comprises a manipulator 8, a manipulator slave computer 9 for controlling the manipulator 8, vision sensors 10 (such as TV cameras), a video monitor 11, vision control slave computers 12 for controlling vision sensors 10 and video monitor 11, an input/output (I/O) control slave computer 13 for controlling the input/output connected to various types of sensors, a color graphic display 14 and a monitoring slave computer 15 for controlling display 14.

Each of slave computers 9,12,13, 15, is connected via high speed system bus 4 to main computer 1 and executes its own particular function, such as instructions for trajectory generation for the arms, conversion into angles of the joints, vision control, feature extraction, etc.

Figures 5, 6:
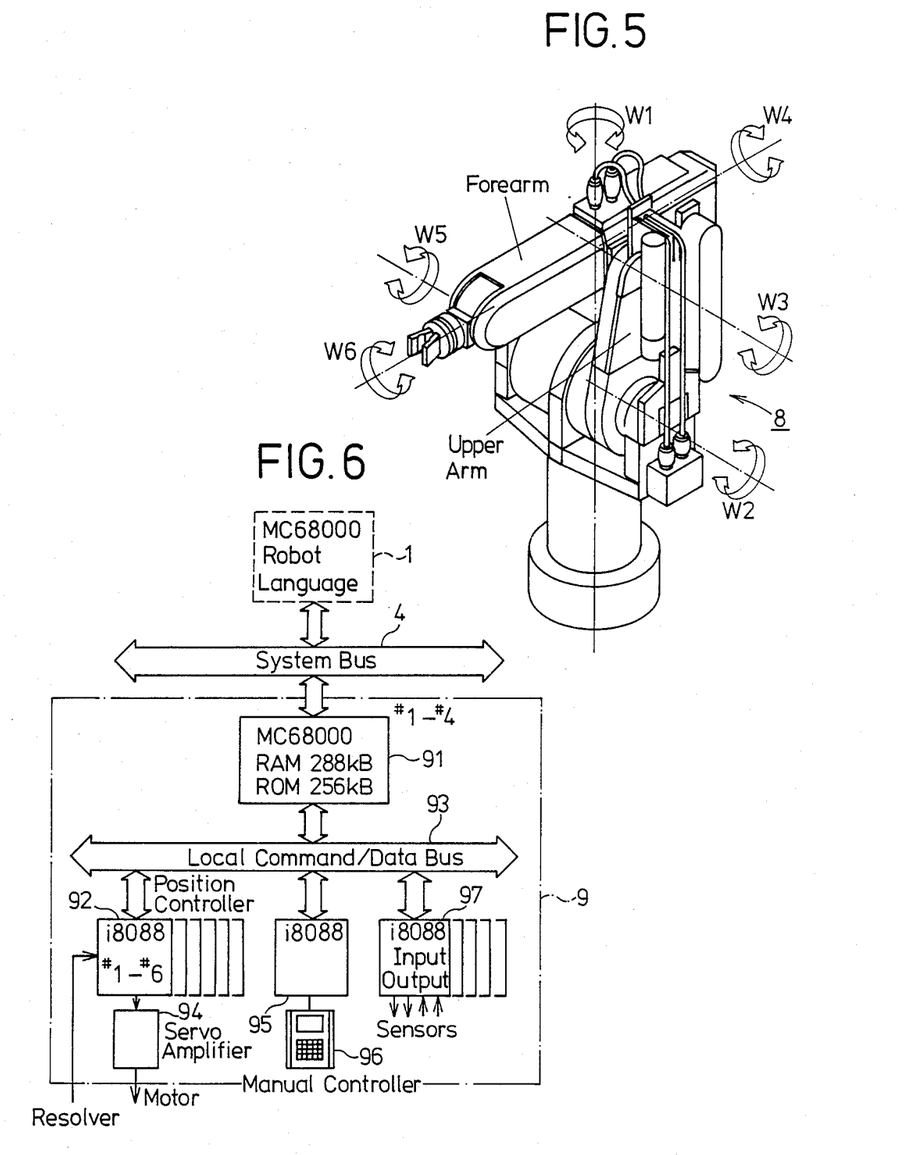
FIG. 5 is a perspective view depicting a manipulator controlled by one of the slave computers.
FIG. 6 is a block diagram depicting a slave computer for controlling the manipulator.

FIG. 5 is a perspective view of manipulator 8 controlled by slave computer 9. Manipulator 8 comprises a 6-freedom degree articulated multiple joint type mechanism comprising a waist rotation W1, a shoulder rotation W2, an elbow rotation W3, a wrist roll W4, a wrist bend W5 and a wrist swivel W6. Each of the joints is driven by a direct drive method wherein the rotor of a motor is directly coupled to the joint to thereby attain high positioning resolution and accurate and reliable repeatability.

FIG. 6 shows details of a slave computer 9 which is used for controlling the manipulator 8 and which comprises a slave controller section 91 which is directly coupled to main computer 1 via high speed system bus 4 and which comprises a random access memory (RAM) and a read only memory (ROM). A plurality of position controllers 92 are connected to slave controller section 91 via a local command/data bus 93. A different controller 92 is used for each different joint control. For example, in this case there are 6 controllers 92 to control the 6 different joint functions in manipulator 8. The joints are controlled using a servo amplifier 94 and input of position feedback signals from a resolver (unnumbered in this figure) The slave computer also comprises a manual controller 95 for controlling manual operation device 96 and an input/output (I/O) controller 97 connected to a force sensor or a tactile sensor (not shown). Each of position controllers 92, manual controller 95 and I/O controller 97, is connected via local command/data bus 93 to slave controller section 91. Local command/data bus 93 may be extended to incorporate other controllers and circuits having other functions, such as, for example, grip control.

Manipulator 8 is controlled by slave controller 91 using instructions stored in the ROM in accordance with selected command applied by the robot language of main computer 1.

Figure 7:
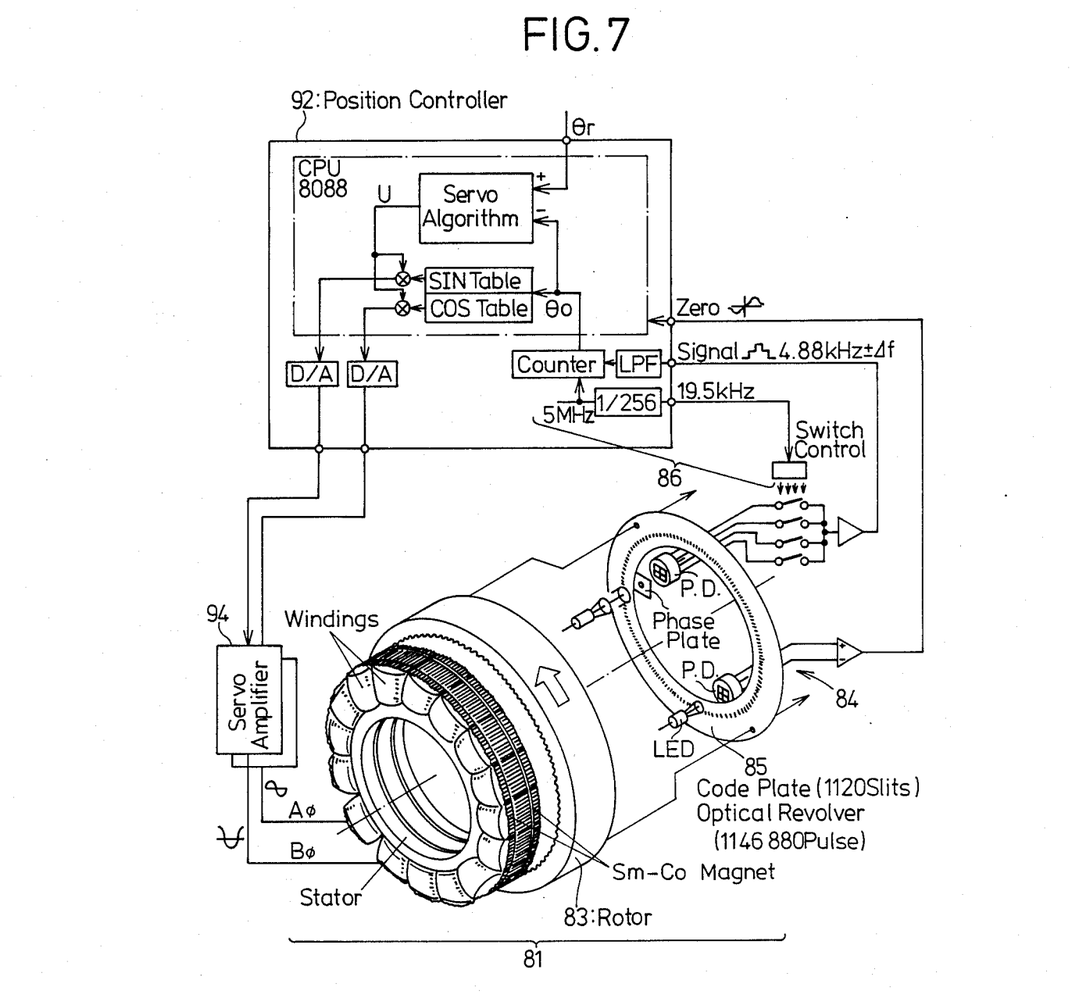
FIG. 7 is a perspective view depicting a servo system controlled by the position controlling controller of FIG. 6.

Two different operational modes may be used, depending on the application desired, that is the PTP (point to point) operational mode and the CP (continuous path ) operational mode interpolated with straight circular spline curves, FIG. 7 shows a servo system which is controlled by position controller 92 of FIG. 6, and which comprises an actuator 81. Actuator 81 is a magnetic inductor type synchronous motor, which is driven by a signal from servo amplifier 94, to generate a rotating angle output signal at rotor 83, which is used for driving the joints. The rotating angle of rotor 83 is detected by an optical resolver 84 and is then fed back to position controller 92 of FIG. 6. The optical resolver 84 interpolates, for example, one of 1120 slits made on a metal code plate 85 with an interpolation circuit 86 using a self running type spatial filter comprising an analog switch, a low pass filter (LPF) and a logic circuit, to obtain an output signal of 1,146,880 pulses/revolution. Consequently, the output signal effects high resolution.

Figure 8:
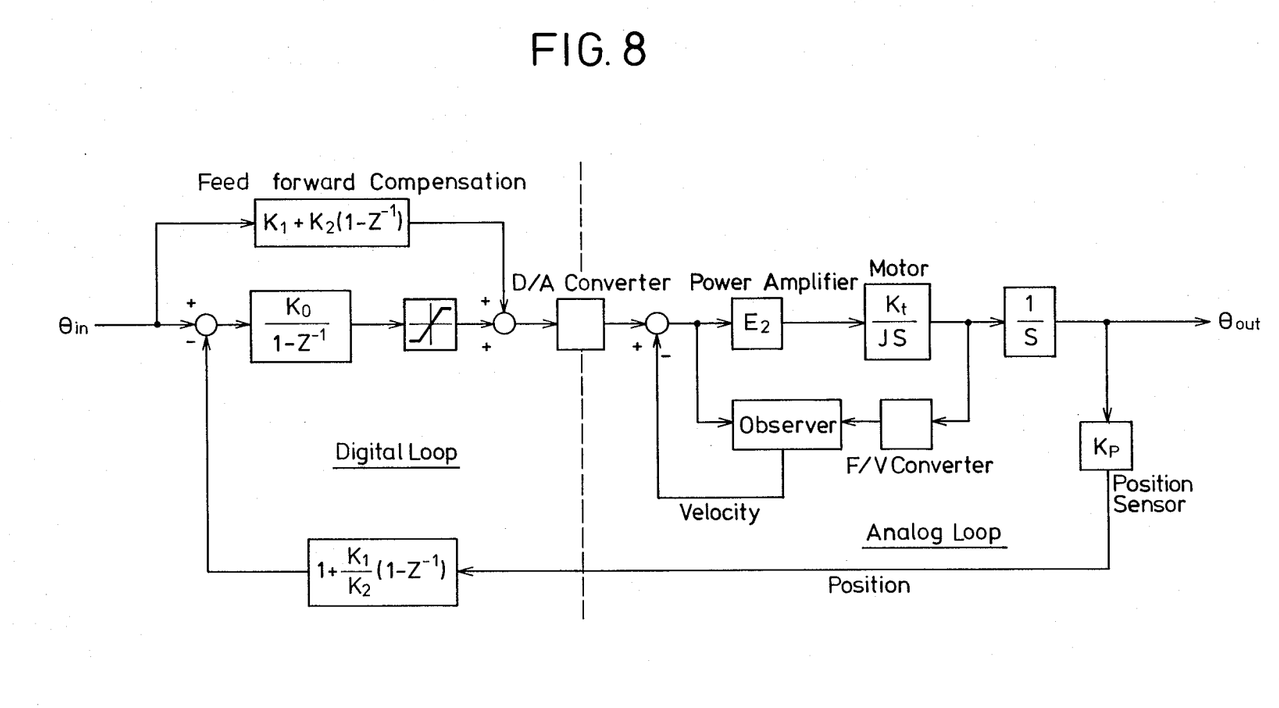
FIG. 8 is a block diagram depicting a servo system.

FIG. 8 shows a servo loop comprising position controller 92 and actuator 81 (see FIG. 6). The servo loop is a proportional (P), integration (I) and differentiation (D) type controller having as shown in FIG. 8, a position signal feedback loop, a speed signal feedback loop and a feed forward loop. In this case, $K_0$, $K_1$, $K_2$ are gain parameters, the values of which are determined by desired criteria for optimal control.

Figure 9:
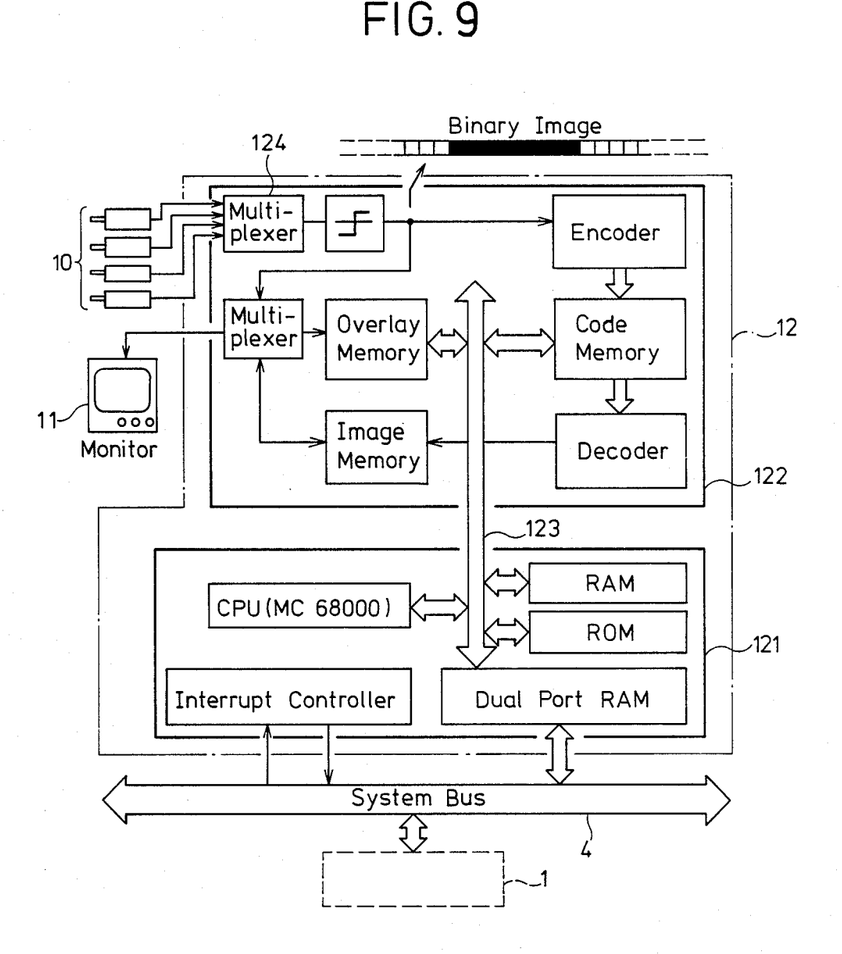
FIG. 9 is a block diagram depicting a vision controlling slave computer.

FIG. 9 shows details of vision control slave computer 12 which is used for controlling vision sensors 10 and video monitor 11 of FIG. 6, and which comprises a slave controller 121, which is directly connected to main computer 1 via bus 4, and which has the same hardware structure as the slave controller section 91(of FIG. 6) in slave computer 9 for controlling manipulator 8. An image processing controller 122 is connected to TV cameras 10 (which may be used as the vision sensor) and video monitor 11. Four TV cameras are connected in this case and the outputs therefrom are selected by a multiplexer 124. The video signals (showing the density from TV cameras 10) selected in multiplexer 124 are digitized and then compressed to aobut 1/50–1/100 by using a run length code, for which various kinds of calculations are performed, such as, for example, feature extraction, measurement of position and orientation of the object, to recognition of the object. The processing results are then displayed on video monitor 11.

Figure 10:
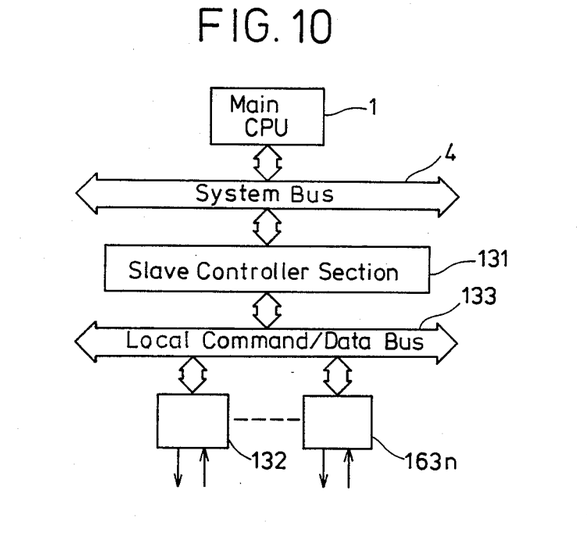
FIG. 10 is a block diagram depicting an input/output (I/O) controlling slave computer.

Slave controller 122 operates upon receiving a command given by the robot language of main computer 1 and executes vision control including image processing, as described. Slave controller 121 and image processing controller 122 are connected via bus 123 of slave controller 121. Bus 123 may be extended and connected, for example, to circuit means for storing the gray scale image and color image (not shown) as desired, FIG. 10 shows details of the I/O controlling slave computer 13, which comprises a slave controller section 131 connected to main computer 1 via high speed system bus 4, and connected to a plurality of I/O controllers 132 . . . 163n via local command/data bus 133. The plurality of controllers 132 . . . 163n each responds to the inputs and outputs connected to various peripheral devices (not shown in this figure). The structure of computer 13 is the same as that for each of the slave computers shown in FIGS. 6, or 9. Various kinds of sensors (not shown) are connected to each I/O controller 132 . . . 163n for inputting signals from the sensors into the I/O controllers in accordance with I/O commands by the robot language from main computer 1. It is also possible to connect I/O controllers 132 . 163n to local bus 93 (see FIG. 6) in manipulator slave computer 9 for performing servo control using a force sensor or a tactile sensor.

Furthermore, communication ports, such as RS 232 and GP/IB, may also be used, in addition to those ports used for sensors in the I/O controllers.

Figure 11:
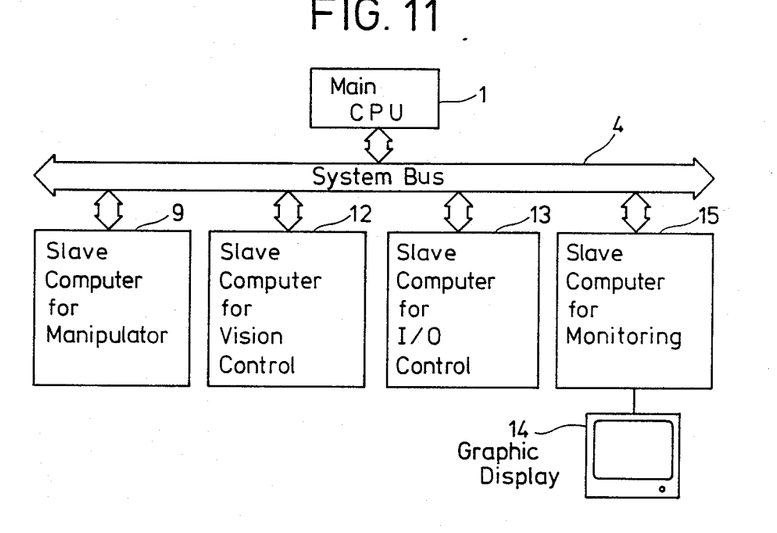
FIG. 11 is a block diagram depicting a portion of the monitoring slave computer.

FIG. 11 shows details of a portion of a monitoring slave computer 15. The slave computers 9,12,13,15 for different functions, such as, for example, the manipulator 89, vision control 12, I/O control 13 and for the monitoring 15, are connected via bus 4 to main computer 1. The processing results in slave computer 15 are displayed on graphic display 14.

Figure 12:
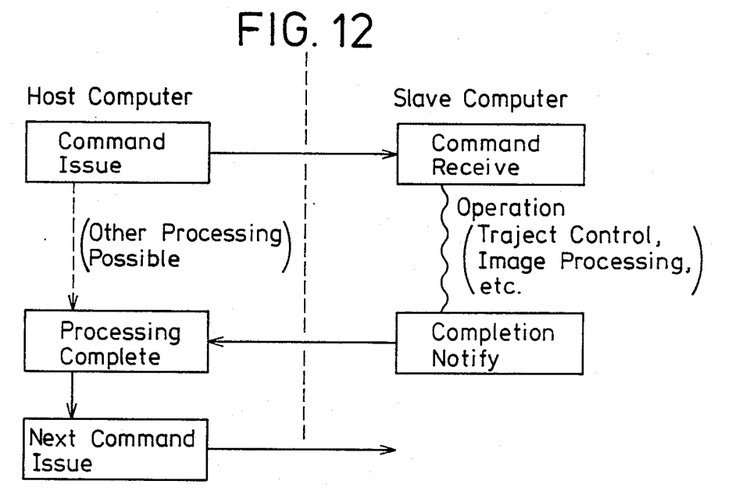
FIG. 12 is a detailed view depicting transfer of commands between the main computer and each of the slave computers.
Figure 13:
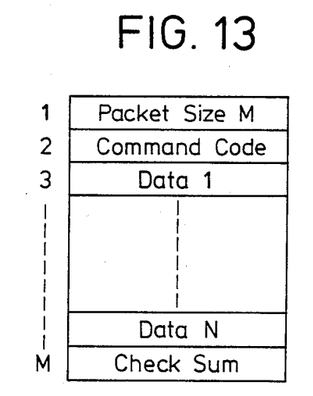
FIG. 13 is a table of commands.

FIG. 12 diagrams the transfer of commands between main computer 1 and each of the slave computers 9,12,13,15. FIG. 13 diagrams the program steps of the command. All of the commands issued from main computer 1 are collected (as shown in FIG. 13) in a packet form, which are then sent to the corresponding slave computer. The slave computer, upon receiving the command, executes the operation in accordance with the command code (e.g. trajectory control for the manipulator or the image processing operation) irrespective of main computer 1 and returns the notification of completion to main computer 1 after completion of the operation. Main computer 1 performs other types of processing after issuing the command until notified of completion by the slave computer. In this case, other processing includes controls for other arms and visions, or mathematical operations, by which cooperative operation between a plurality of arms and between the vision sensors, are efficiently executed.

Multiple programs can be executed in main computer 1 on a real time basis. Concurrent parallel operations can also be performed by allocating each of the multiple programs to the control system for each of the arms and to the vision control. In this case, since a large number of mathematical operations are executed by the slave computers responsible for the arm control and the vision control, advantageously, the entire performance is not reduced or degraded in any manner. Furthermore, since all of the task programs are accommodated in the main memory (not shown) in the main computer 1, advantageously, communication between each of the programs can be performed at extremely high speeds. Moreover, advantageously, the number of tasks over the entire system can be altered all at the same time by merely changing the programs in main computer 1. In this manner, advantageously, frequent change of tasks for the robot is rapidly and readily accomplished.

Each of slave computers 9,12,13, shown in FIGS. 6,9,10, is formed into a module by the unit shown by the block in each figure. A module having a required function, depending on the contents of the desired tasks, is connected to the local/command data bus to construct the system. Each of the modules has a mathematical operational function and executes the local processing independently of other modules. Thus, the loads of other modules are not changed to any great extent by the number of modules.

Monitoring slave computer 15 shown in FIG. 11 is operated by the operation command from main computer 1 transmitted via bus 4 to monitor the operational status of main computer 1 and other slave computers 9,12,13. For example, when the trend monitoring is instructed from main computer 1 to monitoring slave computer 15, monitoring slave computer 15 periodically monitors the operational states of main computer 1 and slave commuters 9,12,13, etc. and stores them in its own memory (not shown). The amount of data to be stored is dependent on the memory capacity, but, old data may be abandoned successively and those for a certain period of time from the newest to the past may be stored, thus reducing required memory capacity.

For example, if any trouble occurs in the system and it is detected by the slave computer 15, the occurrence of trouble is sent to main computer 1 upon notification of completion in accordance with the procedure shown in FIG. 9. Then main computer 1 instructs interruption of monitoring by computer 15 and accesses trouble shooting data, such as the trend data discussed above, stored in the memory of computer 15, to thereby analyze the trouble.

When main computer 1 instructs computer 15, the monitor displays the status of the arm (which is under control of manipulator control computer 9) on subordinate graphic display 14 or CRT 3.

Figure 14:
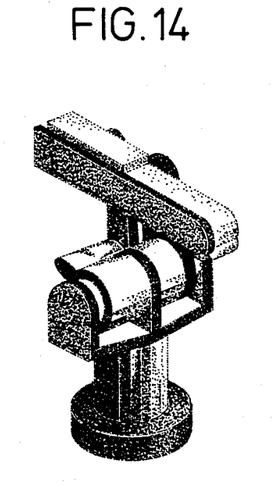
FIG. 14 is a perspective view depicting a 3-dimensional density image of the manipulator outputted on a graphic display.

FIG. 14 shows an example of a 3-dimensional gray scale imate for the manipulator 8 outputted on graphic display 14.

With such a display, advantageously, status monitoring can be visually performed on a real time basis even if manipulator 8 is disposed at a remote site.

Furthermore, slave controller section 91 (FIG. 6) has an operational mode wherein joint angle outputs are not outputted to respective operation controllers 92 and wherein, by monitoring slave controller section 91 by the monitoring slave computer 15 in this operational mode, the operation of the arm of the manipulator can be simulated on the CRT 3 or graphic display unit 14, without actually displacing the arm. This is effective for the "offline programming" and also for the debugging of the system at the work site by using actual sensors.

Figure 15:
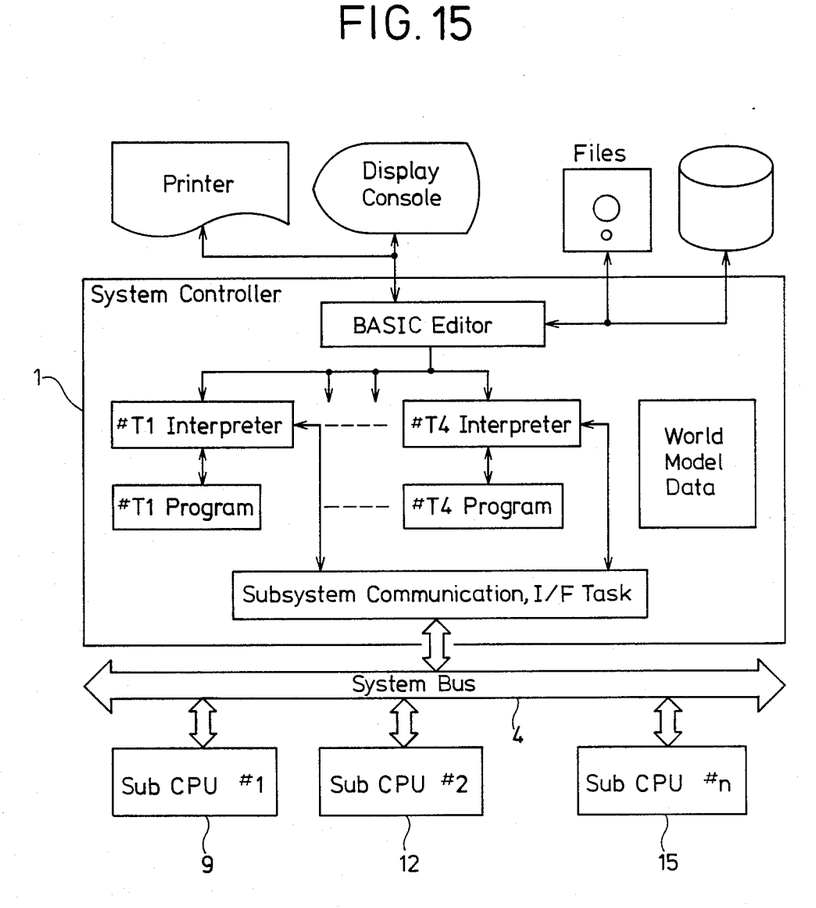
FIG. 15 is a diagrammatical view depicting software of a robot language incorporated in the main computer.

FIG. 15 diagrammatically shows software of the robot language incorporated in main computer 1. Table 1 hereinbelow shows the principal functions of the robot language.

The robot language includes number of exclusive commands such as various types of inputs and outputs for the manipulator and the vision sensors, communication with the supervisory computer and data base control, and task programs are prepared by using these commands. As shown in FIG. 15, four user's programs areas (#T1-#T4) are prepared in the main memory within main computer 1, to enable use of the multiple programs. The multiple programming function is effectively for efficiently executing concurrent parallel operations, such as cooperative operations for a plurality of manipulators or vision sensors. Furthermore, world model data (used in common with all of the programs and the region, or used in executing the communication with the slave computer (I/F task)), are prepared.

Figure 16:
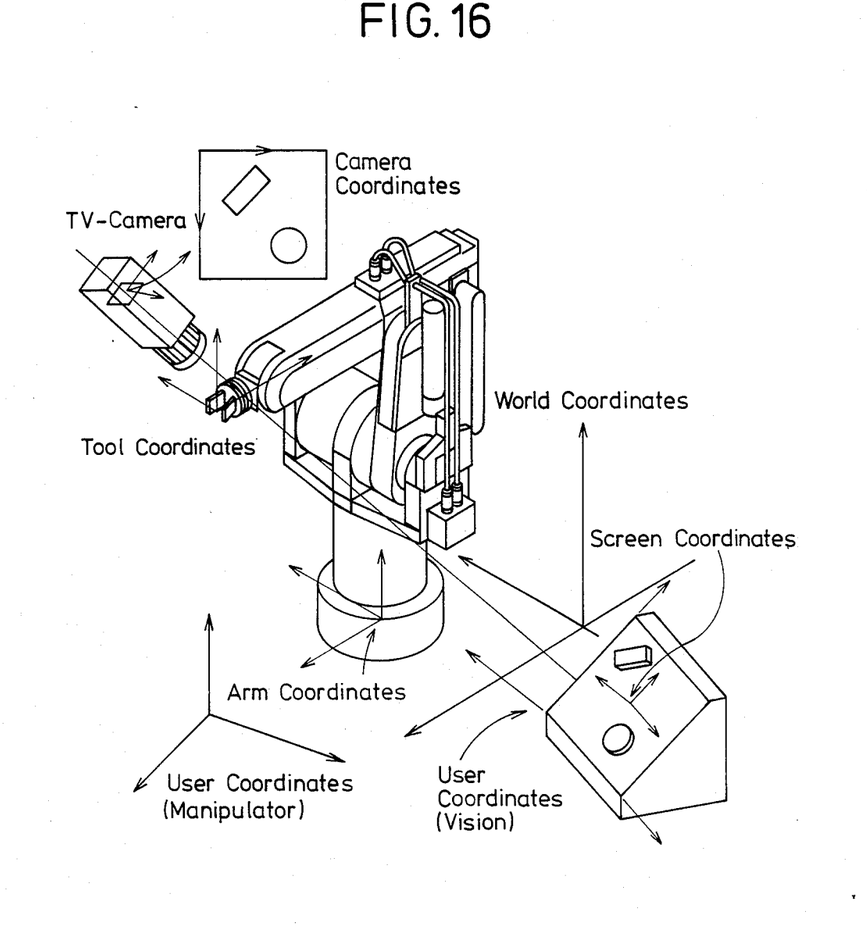
FIGS. 16 and 17 are explanatory views depicting the relationship between each of the coordinate systems.

Furthermore, as depicted in FIG. 16, the manipulator and the vision sensor (TV camera), respectively, maybe connected to have inherent coordinate systems. Accordingly, data conversion between each of the coordinate systems is required for cooperative operation. The robot language incorporated in main computer 1 has a world coordinate system and data conversion between each of the coordinate systems is carried out automatically by stating the offset of the inherent coordinate systems for the manipulator or vision sensors relative to the world coordinate system. Since all of the data in the entire system can thus be handled relative to the world coordinate system, it is not necessary to take the inherent coordinate systems for the manipulator and for the vision sensors into consideration, which relieves the operator from converting the coordinate systems. Moreover, since the operator can determine the optional coordinate system relative to the world coordinate system, there is no necessity for the conversion even where data has an original point in the coordinate, such as in the case of CAD data.

TABLE 1

1. Fundamental BASIC statements.
2. System Management.

TABLE 1-continued

Job management, Subsystem Assignment, Current Subsystem select.
3. File Management.
   Create/delete, Input/output.
4. Wold Model Data Management.
   Name Table Management, Database management, Vision Feature handling.
5. Multi-programming.
   Concurrent Processing of programs, Synchronization between programs.
6. Real time and exception processing.
   Processing interrupt, Error and Time out, Resource management of Subsystems.
7. Coordinate Frame Definition
8. Manipulator Control.
   Motion control, Trajectory Mode control, Current Location reference.
9. Vision Control.
   Hardware control, Image processing, Feature Extraction.
10. I/O Handling.
    Input/output
11. Debugging.
    Simulator select, Trace, Break points.

Figure 17:
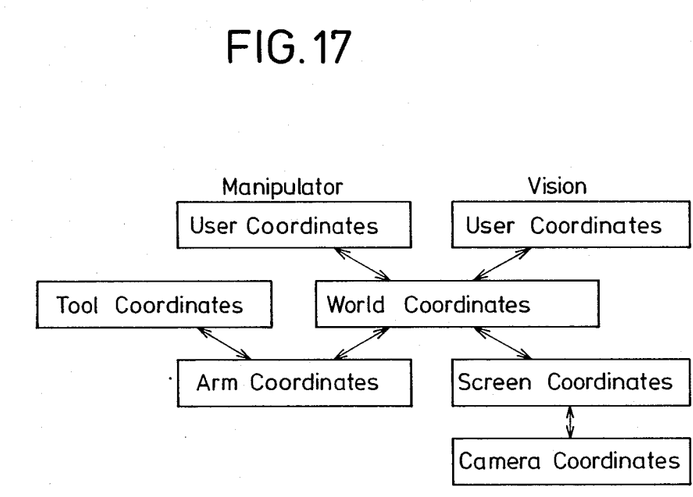

FIG. 17 is a view showing the relationship between each of the coordinate systems.

As discussed above, the system comprises a main computer and a plurality of slave computers connected therewith, wherein the main computer executes the task programs, while a plurality of slave computers execute their inherent functions pursuant to command from the main computer directed to the corresponding operational unit. Thus, advantageously, the flexibility of system architecture is enhanced and concurrent parallel operation and cooperative operation between a plurality of manipulators or vision sensors are performed efficiently. Furthermore, since the task programs and data are centralized in the main computer, advantageously, data access and communication between each of the programs can be accomplished at high speeds. Also, the system can readily accommodate frequent changes of tasks and products being worked on.

The foregoing description is illustrative of the principles of the invention. Numerous modifications and extensions thereof would be apparent to the worker skilled in the art. All such modifications and extension are to be considered to be within the spirit and scope of the invention.

What is claimed is:

1. A distributed robot control system comprising:
   (a) a main computer means for (i) preparing a centralized task program, (ii) executing said centralized task program, and (iii) supplying command signals representing said centralized task program;
   (b) at least one manipulator control slave computer means for individually, concurrently, and parallelly controlling parts of a manipulator;
   (c) at least one vision control slave computer means for individually, concurrently, and parallelly controlling a vision sensor for supplying images;
   (d) a high speed system bus, said bus being connected to each computer means;
   (e) wherein said at least one manipulator control slave computer means comprises:
      a slave controller means for individually calculating trajectory positions of one or more arms of said manipulator and desired angle positions of one or more joints of said manipulator from the control signals;
      a plurality of position controller means for controlling the arm and joint positions of said manipulator in accordance with the trajectory and angle positions calculated by said slave controller means; and
      a local command and data bus connected to said slave controller means and said plurality of position controller means; and
   (f) wherein said at least one vision control slave computer means comprises:
      a slave vision controller means for (i) receiving said command signals and (ii) producing control signals based on said command signals;
      an image processing controller means for (i) receiving said control signals, (ii) processing images from said vision sensor, and (iii) recognizing a target in the images in accordance with said control signals; and
      a data bus connected to said slave vision controller means and said image processing controller means.

2. The system of claim 1, wherein said main computer comprises means for automatically converting data between each of a plurality of coordinate systems based on an offset of an inherent coordinate system for said manipulator and an offset of an inherent coordinate system for said vision sensor, relative to a world coordinate system.

3. The system of claim 1, further comprising
   a servo means for (i) determining the value of the actual angle and trajectory positions of said manipulator and (ii) transmitting the determined values to said plurality of position controller means.

4. The system of claim 3, wherein the servo means comprises:
   a magnetic inductor type synchronous motor for driving said manipulator based on a signal from one of said plurality of position controller means, said motor having an outer rotor; and
   an optical resolver means for (i) detecting a rotational displacement of said outer rotor, (ii) generating a positional signal from said detected rotational displacement, and (iii) supplying the generated signal to said one of plurality of position controller means.

5. The system of claim 1, further comprising
   a slave monitor computer means, connected to said high speed system bus, for monitoring respective operational states of said main computer means.

6. The system of claim 1, wherein said image processing controller means comprises:
   means for digitizing one of said images supplied by said vision sensor into digital values forming a binary image formed by pixels, said one image being an object;
   means for compressing the digitized values using a runlength code with X, Y addresses of each left end pixel and the number of horizontally connected pixels of said one image;
   means for counting the number of pixels; and
   means for calculating the X,Y coordinates of the center of gravity of said object based on said compressing and counting.

7. The system of claim 1, wherein said manipulator control slave computer comprises a plurality of position controllers of a number equal to the number of joints to be controlled in said manipulator, a manual controller for controlling manual operation, and an input/output controller connected to a force sensor and a tactile sensor, said plurality of position controllers and said input/output controller being connected to said local command and data bus.

8. The system of claim 7, further comprising a magnetic inductor type synchronous motor driving a rotor, said optical resolver being connected to said rotor, means for connecting said optical resolver to said plurality of position controllers, and servo amplifier connected to said motor and to said plurality of position controllers so that position feedback signals representing angle of rotation of said optical resolver is applied to said plurality of position controllers.

9. The system of claim 4, wherein said optical resolver comprises a slit plate, means on one side of said slit plate for applying light to said slit plate, a photodiode array on the other side of said slit plate for receiving light from said means for applying light passed through slits formed in said slit plate, and a self running type spatial filter connected to said photodiode array and comprising a plurality of analog switches.

* * * * *